United States Patent
Sayre et al.

(10) Patent No.: US 8,224,067 B1
(45) Date of Patent: Jul. 17, 2012

(54) STEREO IMAGE CONVERGENCE CHARACTERIZATION AND ADJUSTMENT

(75) Inventors: Rick Sayre, Kensington, CA (US); Rod Bogart, San Rafael, CA (US)

(73) Assignee: Pixar Animation Studios, Emeryville, CA (US)

( * ) Notice: Subject to any disclaimer, the term of this patent is extended or adjusted under 35 U.S.C. 154(b) by 1007 days.

(21) Appl. No.: 12/175,403

(22) Filed: Jul. 17, 2008

(51) Int. Cl.
*G06K 9/00* (2006.01)
*G06T 15/00* (2011.01)

(52) U.S. Cl. .......................... 382/154; 345/419; 348/42
(58) Field of Classification Search .................. 382/154; 345/419; 348/42
See application file for complete search history.

(56) References Cited

U.S. PATENT DOCUMENTS

| | | | |
|---|---|---|---|
| 6,198,484 B1* | 3/2001 | Kameyama | 345/419 |
| 7,181,136 B2* | 2/2007 | Perisic | 396/331 |
| 2005/0117215 A1 | 6/2005 | Lange | |
| 2007/0285663 A1 | 12/2007 | Hewitt et al. | |
| 2008/0309756 A1 | 12/2008 | Verburgh et al. | |
| 2009/0040295 A1* | 2/2009 | Koo et al. | 348/42 |
| 2011/0109797 A1* | 5/2011 | Dunton | 348/468 |

OTHER PUBLICATIONS

Office Action U.S. Appl. No. 12/175,408 dated Dec. 21, 2011.

* cited by examiner

*Primary Examiner* — John Strege
(74) *Attorney, Agent, or Firm* — Patterson & Sheridan, LLP (57) ABSTRACT

A system and method for characterizing and adjusting an offset between displayed stereo image pairs allows for calibration of the stereo image content for each display environment. The stereo image content is typically authored assuming a particular display image size. When the stereo image content is displayed in a display environment that does not conform to the particular display image size the offset between displayed stereo image pairs is increased or decreased, resulting in a viewing experience that is different than intended. In some cases, the viewer may experience discomfort due to eye strain or eye fatigue. Adjusting the offset during the playback of the stereo image content may improve the viewer experience.

31 Claims, 11 Drawing Sheets

STEREO IMAGE CONVERGENCE CHARACTERIZATION AND ADJUSTMENT

BACKGROUND

1. Field of the Invention

The present invention relates generally to the display of stereo images and more specifically to a system and method for characterizing and adjusting an offset between stereo image pairs for a display environment during playback.

2. Description of the Related Art

Historically, stereo images were displayed using two projectors, one projecting images viewed only by the left eye, and the other projecting images viewed only by the right eye. The left and right eye images were then manually aligned to control the convergence point of the stereo image produced by each left-eye/right-eye image pair projected onto a screen. More recently, the use of single lens stereo projection systems, has made adjusting the convergence point of a stereo image impossible when the stereo image is displayed.

When stereo image content is created, a displayed image size is assumed, and the perceived distance from the viewer where objects appear in a scene (e.g., in front of the screen, coincident with the screen, or behind the screen) is controlled by the author of the stereo image content assuming a predetermined alignment between the left and right eye image pairs. The predetermined alignment corresponds to the assumed displayed image size. One problem with such as approach is that, when the image content is displayed on a smaller or larger screen, the perceived distance of the objects in the scene is affected as a result of an increased or decreased image pair alignment. In some cases, the increased or decreased alignment causes a viewer to experience discomfort due to eye strain or eye fatigue. This problem is further illustrated below in FIGS. 1A-1F.

Figure 1A:
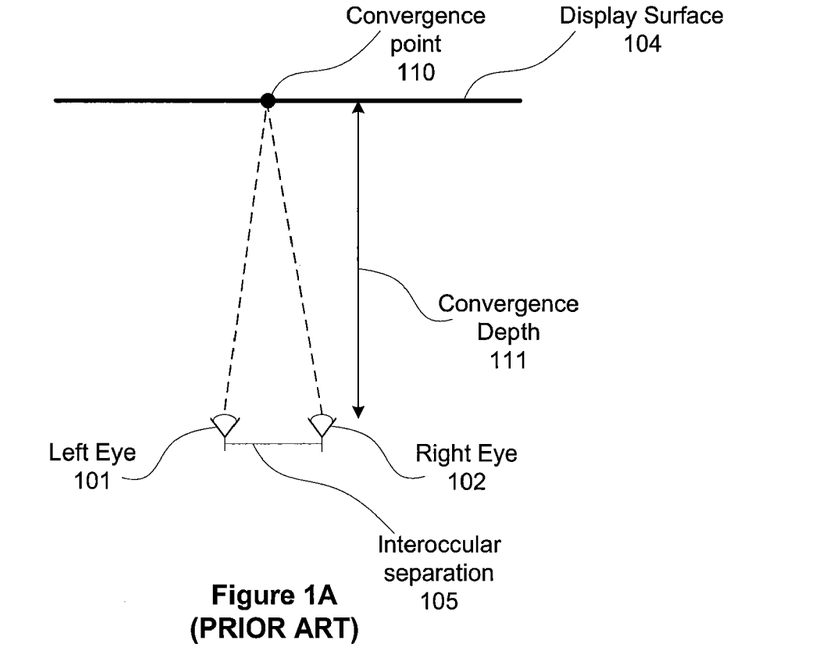
FIG. 1A is an illustration of a prior art stereoscopic geometry with a convergence depth that equals the display surface depth.

FIG. 1A is an illustration of a prior art stereoscopic geometry with a convergence depth 111 that equals the display surface depth. A left eye 101 and right eye 102 are separated by an interoccular separation 105. An object that is offset for the left eye image by interoccular separation 105 relative to the right eye image is perceived to appear coincident with display surface 104. In other words, objects that are not separated in the left and right eye images appear in the plane of the display surface. The intersection of the view vectors from left eye 101 and right eye 105 is convergence point 110, which is shown as coincident with display surface 104. During construction of a stereoscopic image, the alignment of left and right eye views for objects in the scene is determined by the author and controls the perceived depth at which the objects appear to a viewer.

Figure 1B:
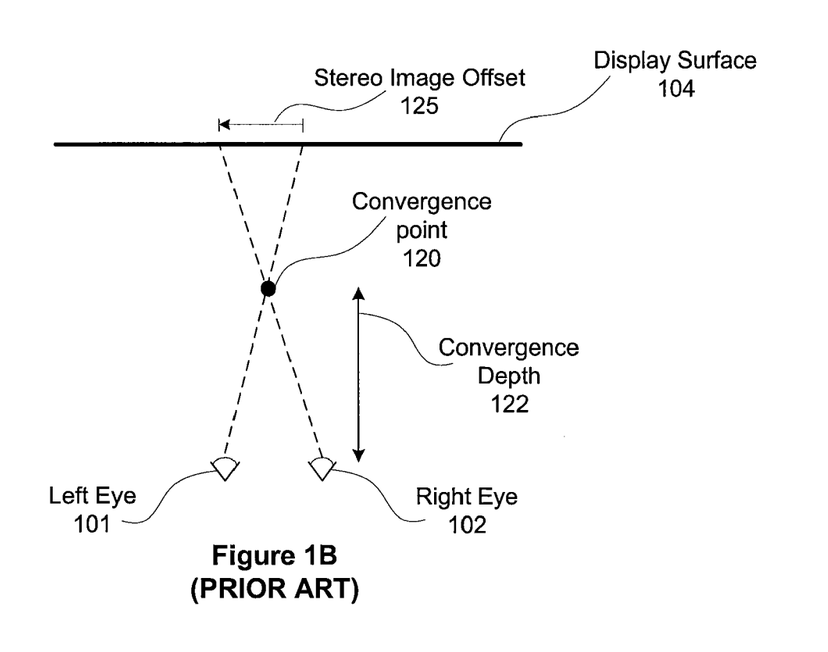
FIG. 1B is an illustration of a prior art stereoscopic geometry with a convergence depth that is less than the display surface depth.
Figure 1C:
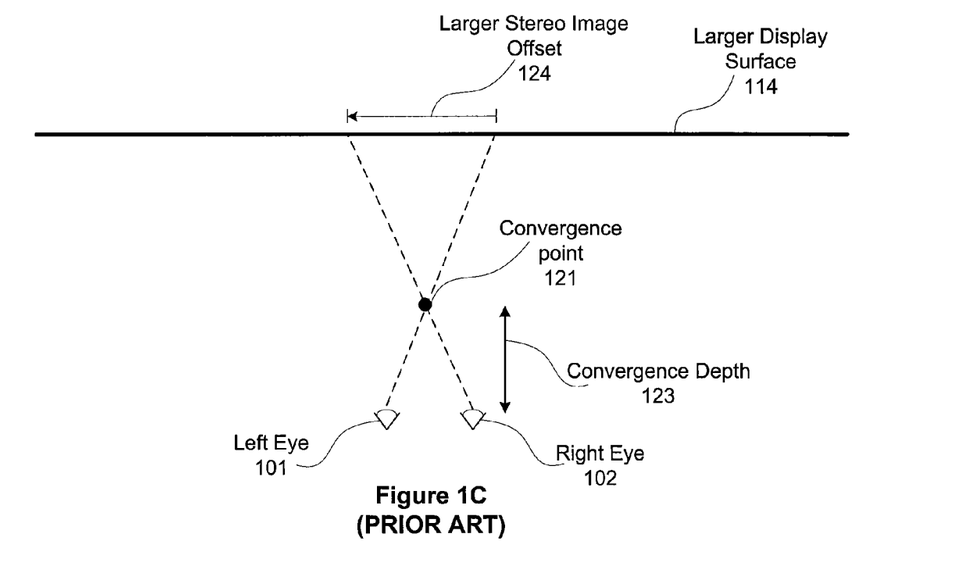
FIG. 1C is an illustration of a prior art stereoscopic geometry for a larger display surface with a convergence depth that is less than the display surface depth.

FIG. 1B is an illustration of a prior art stereoscopic geometry with a convergence depth 122 that is less than the depth of display surface 104. An object that is offset to the left by stereo image offset 125 in the right eye image compared with the left eye image appears to the viewer at convergence point 120 (i.e., in front of display surface 104). When the right eye image and left eye image are scaled up, the convergence point shifts closer to the viewer. FIG. 1C is an illustration of a prior art stereoscopic geometry for a larger display surface 114 with a convergence depth 123 that is less than the intended convergence depth 122. As shown, as stereo images are scaled to fit the larger display surface 114 (relative to the display surface 104), stereo image offset 125 is scaled to equal larger stereo image offset 124. The viewer may experience discomfort due to increased cross-eyedness as a result of larger stereo image offset 124 since objects in the scene appear at convergence point 121 instead of at convergence point 120.

Figure 1D:
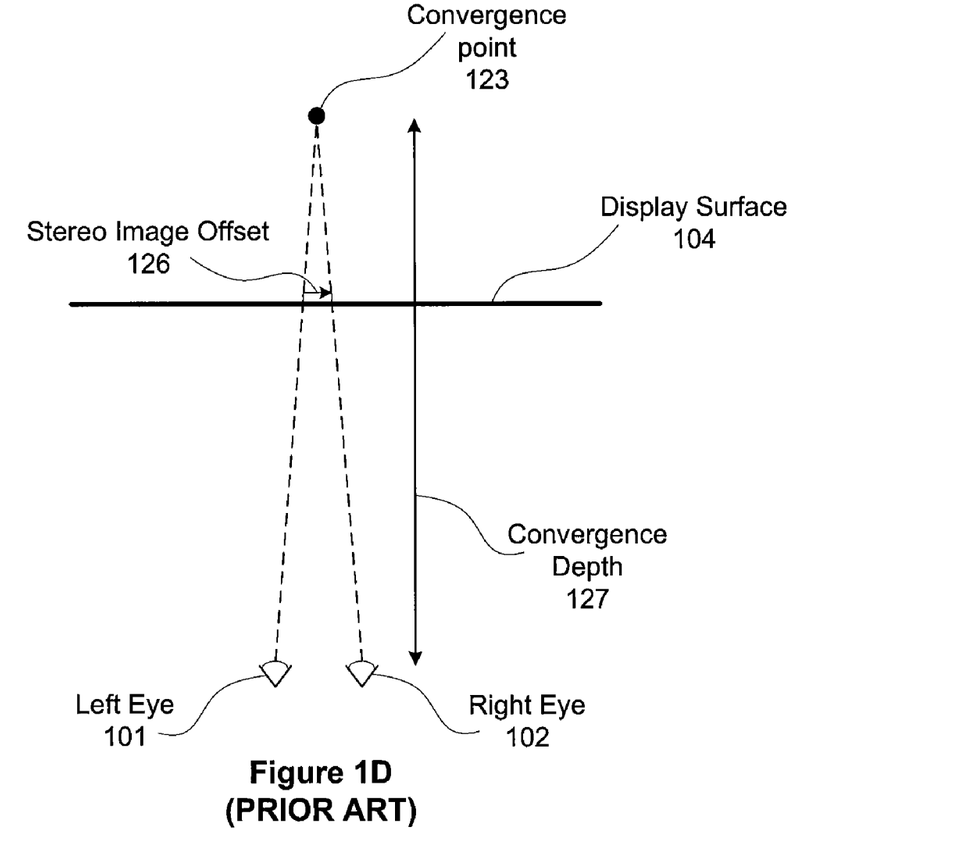
FIG. 1D is an illustration of a prior art stereoscopic geometry with a convergence depth that is greater than the display surface depth.
Figure 1E:
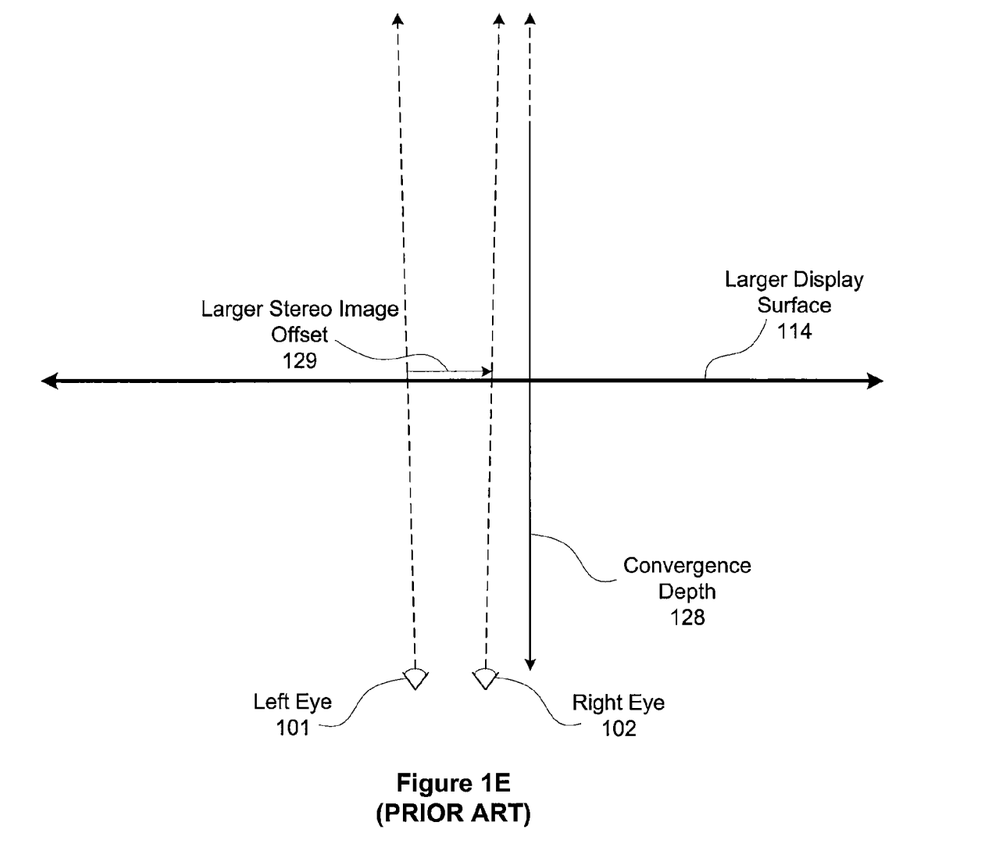
FIG. 1E is an illustration of a prior art stereoscopic geometry for a larger display surface with convergence depth that is greater than the display surface depth.

FIG. 1D is an illustration of a prior art stereoscopic geometry with a convergence depth 127 that is greater than the depth of display surface 104. An object that is offset to the right by stereo image offset 126 in the right eye image compared with the left eye image appears to the viewer at convergence point 123 (i.e., behind display surface 104). When the right eye image and left eye image are scaled up, the convergence point shifts further from the viewer. Objects that are separated by interoccular separation 105 in the left eye and right eye images appear at infinity. FIG. 1E is an illustration of a prior art stereoscopic geometry for larger display surface 114 with a convergence depth 128 that is greater than the intended convergence depth 127 since the separation between the left eye and right eye images is greater than interoccular separation 105. As shown, as stereo images are scaled to fit the larger display surface 114 (relative to the display surface 104) stereo image offset 126 is scaled to equal larger stereo image offset 129 as the stereo images are scaled to fit larger display surface 114. The viewer more than likely may see double images or experience discomfort due to increased divergence as a result of larger stereo image offset 129 since objects in the scene appear beyond infinity instead of at convergence point 123.

Figure 1F:
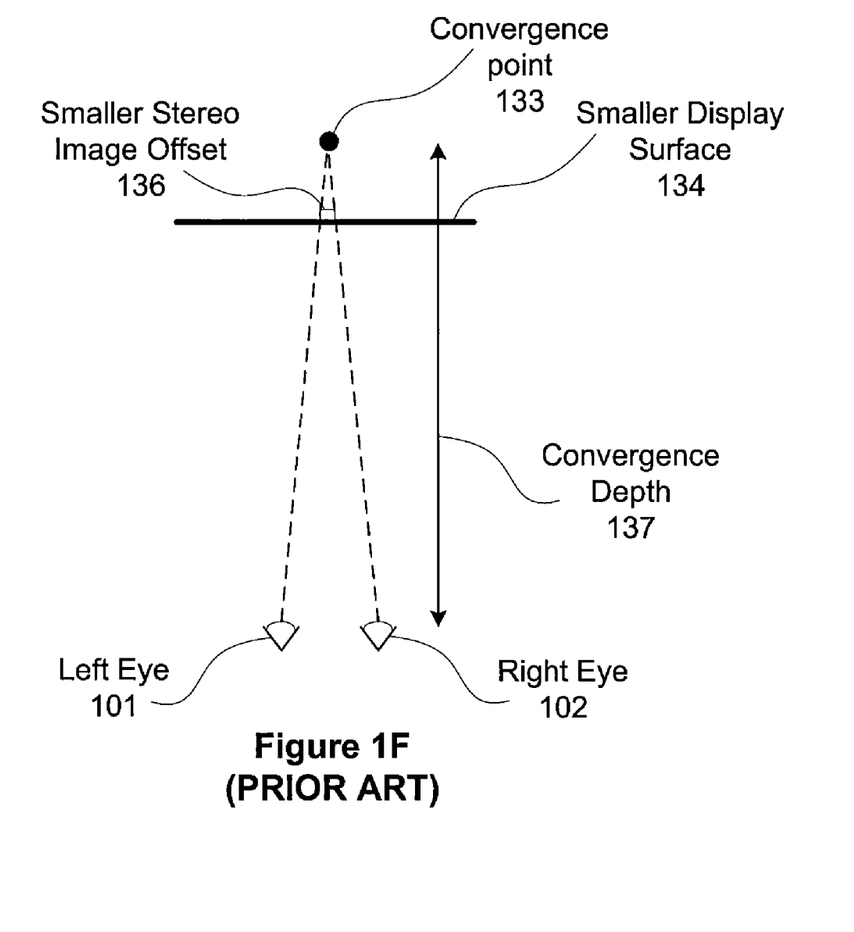
FIG. 1F is an illustration of a prior art stereoscopic geometry for a smaller display surface with convergence depth that is less than the display surface depth.

Similarly, when the right eye image and left eye image are scaled down, the convergence point shifts closer to the viewer and objects that were intended to appear behind the screen may appear coincident with the screen. FIG. 1F is an illustration of prior art stereoscopic geometry for a smaller display surface 134 with convergence depth 137 that is less than the intended convergence depth 127. As shown, as stereo images are scaled to fit the smaller display surface 134 (relative to the display surface 104) stereo image offset 126 is scaled to equal smaller stereo image offset 136. Again, objects in the scene do not appear at the depths that were intended when the stereoscopic content was created since the stereo image offset used to produce the content does not match smaller stereo image offset 136.

As the foregoing illustrates, what is needed in the art is the ability to modify the alignment between stereoscopic images based on the size of the display surface when a single lens stereo projection system is used.

SUMMARY

A system and method for characterizing and adjusting an offset between displayed stereo image pairs allows for calibration of the stereo image content for each display environment. The stereo image content is typically authored assuming a particular display image size. When the stereo image content is displayed in a display environment that does not conform to the particular display image size the offset between displayed stereo image pairs is increased or decreased, resulting in a viewing experience that is different than intended. In some cases, the viewer may experience discomfort due to eye strain or eye fatigue. Adjusting the offset during the playback of the stereo image content may improve the viewer experience.

A system and method for adjusting a convergence point for a stereoscopic image includes determining that an offset between a left eye image and a right eye image of a stereo image pair in a display environment does not equal a predetermined offset value and determining an adjustment factor that, when applied to the offset, increases or decreases the offset to produce a calibrated offset between the left eye image and the right eye image of the stereo image pair to adjust the convergence point for the display environment.

Various embodiments of a method of the invention for aligning a left eye image and the right eye image of a stereoscopic image pair in a display environment include receiving characterization information specific to the display environment, receiving the left eye image of the stereoscopic image pair, and receiving the right eye image of the stereoscopic image pair. The method then adjusts an offset between the left eye image and the right eye image using the characterization information to change a perceived depth of an object in a scene represented by the stereoscopic image pair.

Various embodiments of the invention include a system for calibrating stereoscopic images. The system includes a display processor configured to receive stereo image pair characterization data indicating that an offset between a left eye image and a right eye image of a stereo image pair in a display environment does not equal a predetermined offset value and determine an adjustment factor using the characterization data that when applied to the offset increases or decreases the offset to produce a calibrated offset between the left eye image and the right eye image of the stereo image pair to adjust a convergence point for the display environment.

Various embodiments of the invention include a system for stereoscopic image display. The system includes a display processor configured to receive characterization information specific to a display environment, receive a left eye image of a stereoscopic image pair, and receive a right eye image of the stereoscopic image pair. The display processor adjusts an offset between the left eye image and the right eye image using the characterization information to change a perceived depth of an object in a scene represented by the stereoscopic image pair.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A system and method for characterizing and adjusting an offset between the left eye image and the right eye image of stereo image pairs allows for calibration of the convergence point for each display environment. When the stereo image content is displayed in a display environment that does not conform to the display image size used to author the content, the offset between displayed stereo image pairs is undesirably increased or decreased, resulting in a viewing experience that is different than intended. In some cases, the viewer may experience discomfort due to eye strain or eye fatigue. Adjusting the offset during the playback of the stereo image content to compensate for this phenomenon may improve the viewer experience and allow control of the convergence point position to match the position intended by the content author.

Figure 2A:
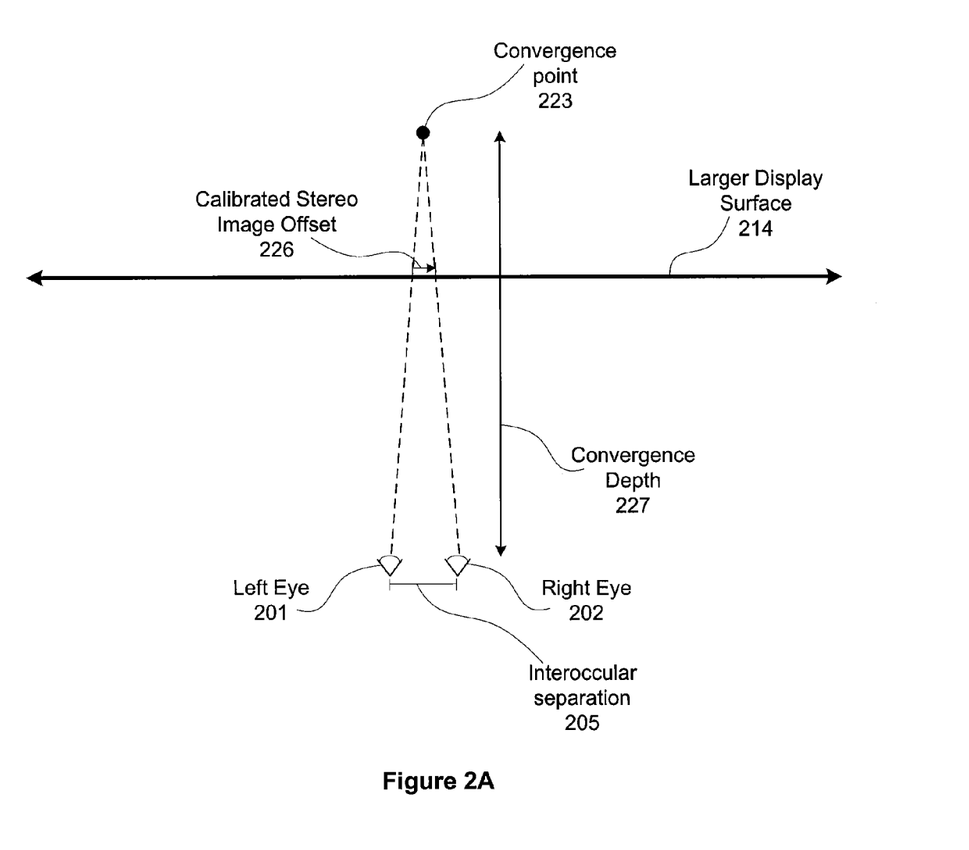
FIG. 2A is an illustration of stereoscopic geometry for a larger display surface using an adjusted stereo image offset, according to one embodiment of the present invention.

FIG. 2A is an illustration of stereoscopic geometry for a larger display surface 214 using an adjusted stereo image offset 226, according to one embodiment of the present invention. A left eye 201 and a right eye 202 are separated by an interoccular separation 205. Rather than simply scaling the left eye image and the right eye image for display on larger display surface 214, thereby increasing the stereo image offset, the alignment of the left eye image and right eye image is modified to reduce the actual stereo image offset to equal calibrated stereo image offset 226. Calibrated stereo image offset 226 equals a predetermined offset that corresponds to the convergence point 223 and convergence depth 227 originally intended by the content author. With this technique, objects in the stereoscopic image intended to appear at a particular depth, based on an assumed screen size used to create the image content, will appear at that depth when the image is scaled to fit larger display surface 214. Consequently, the likelihood that a viewer will experience eyestrain resulting from scaling up stereo images is reduced.

Advantageously, since calibrated stereo image offset 226 is used to align stereo image pairs as they are scaled up or down at the time of display, stereo image pairs authored for particular screen sizes may be adjusted using different image offsets and displayed on a variety of different screen sizes. Thus, different sets of image pairs do not need to be created for each target screen size.

Figure 2B:
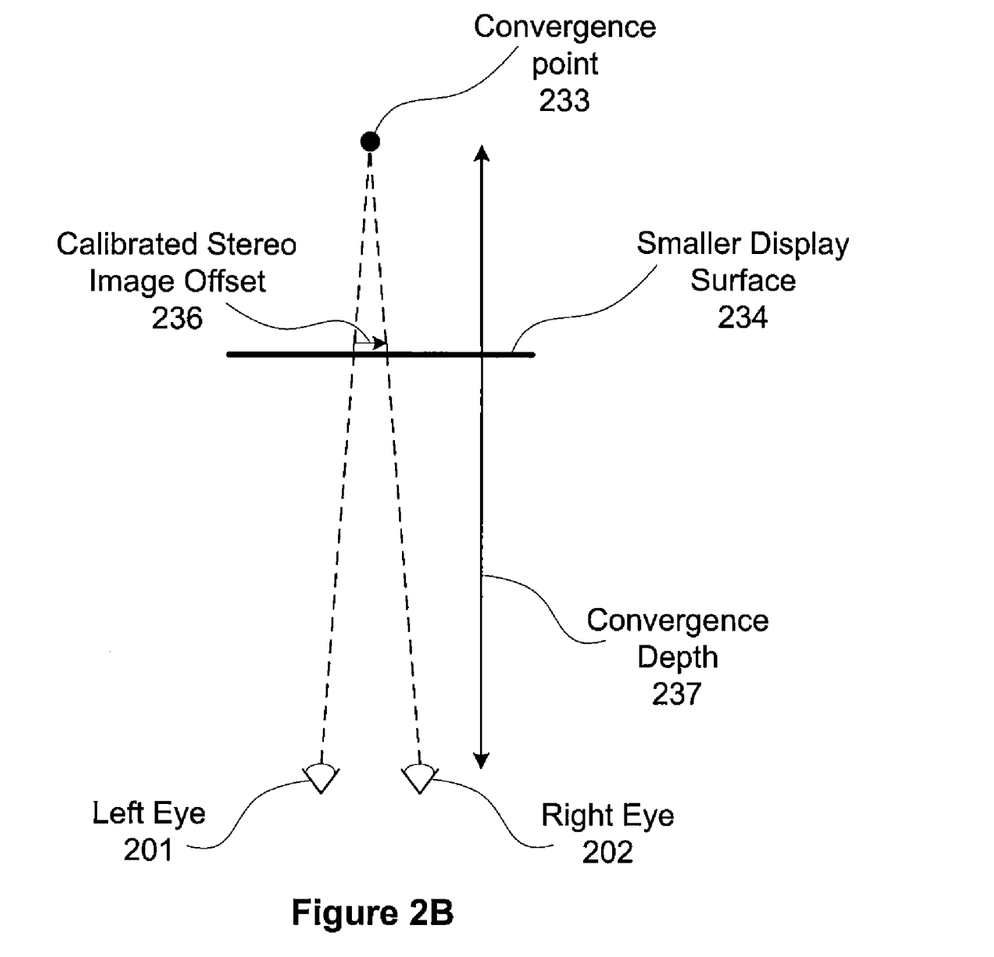
FIG. 2B is an illustration of stereoscopic geometry for a smaller display surface using an adjusted stereo image offset, according to one embodiment of the present invention.

FIG. 2B is an illustration of stereoscopic geometry for a smaller display surface 234 using a calibrated stereo image offset 236, according to one embodiment of the present invention. Rather than simply scaling the left eye image and the right eye image for display on smaller display surface 234, thereby decreasing the stereo image offset, the alignment of the left eye image and right eye image is modified to increase the actual stereo image offset to equal calibrated stereo image offset 226. Again, calibrated stereo image offset 226 equals a predetermined offset that corresponds to the convergence point 233 and convergence depth 237 originally intended by the content author. Similar to that described above, with this technique objects in the stereoscopic image intended by the content author to appear at a particular depth, based on an assumed screen size used to create the image content, will appear at that particular depth when the content is scaled to fill smaller display surface 234. In this fashion, the likelihood that a viewer will experience eyestrain resulting from scaling down stereo images is reduced.

Figure 2C:
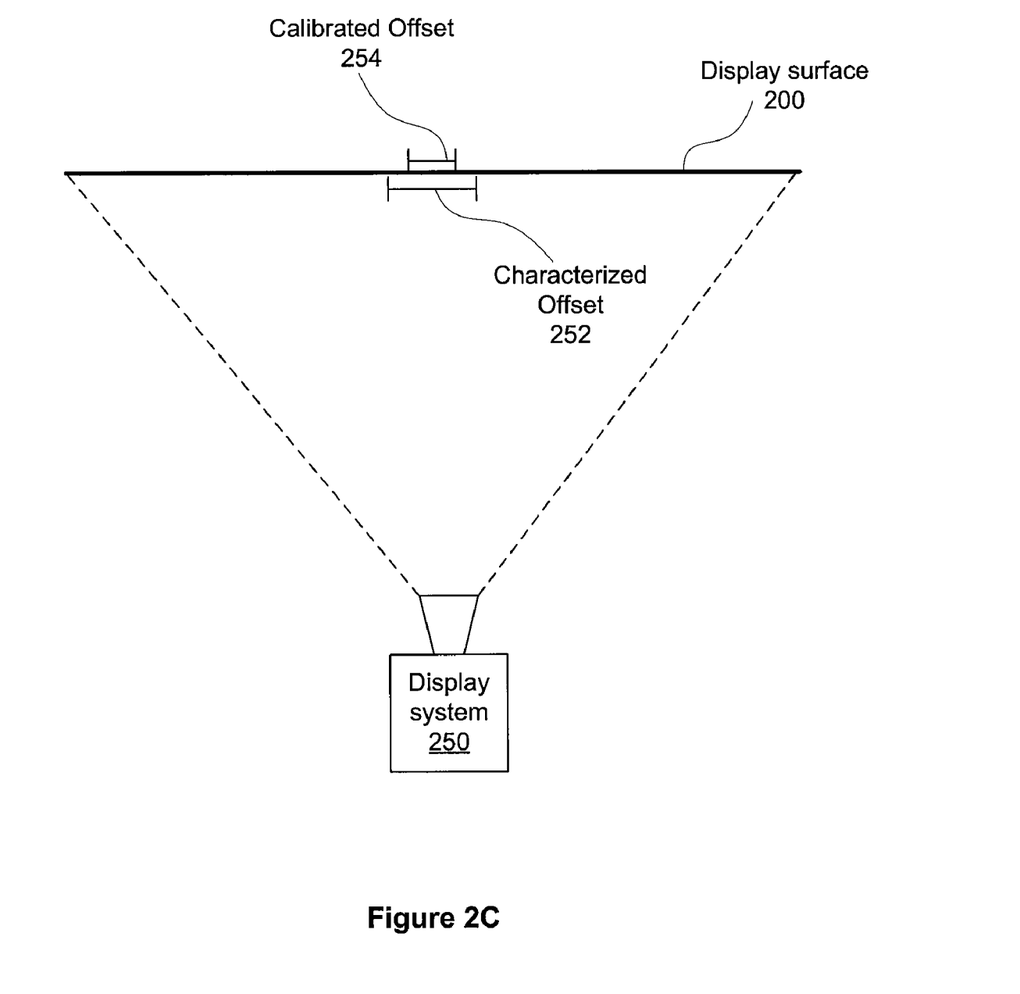
FIG. 2C is an illustration of a display system with associated stereoscopic geometry, according to one embodiment of the present invention.

FIG. 2C is an illustration of a display system 250 with associated stereoscopic geometry, according to one embodiment of the present invention. Display system 250 may include a media center and projector that is configured to project stereo images onto a display surface 200. In an alternative embodiment, display surface 200 may be a flat panel display, and display system 250 may provide data to produce an image on display surface 200. In the configuration shown, a viewer may be positioned either in front of or behind display surface 200. Characterized offset 252 is the actual image offset produced by any scaling of the stereo images being displayed on display surface 200. The value of characterized offset 252 is first determined, and then the left eye image and the right eye image are aligned by modifying the (actual image) offset to equal a calibrated offset 254. Calibrated offset 254 should equal the predetermined offset that was used to create the stereo image content. As persons skilled in the art will appreciate, when the offset requires no adjustment to equal calibrated offset 254, display surface 200 is the display size used to create the stereo image content.

As also shown in FIG. 2C, characterized offset 252 is larger than calibrated offset 254, indicating that the stereo image pair was scaled up by display system 250 for display on display surface 200. Display system 250 is configured to adjust the alignment between the left and right eye images by modifying the offset that initially equals characterized offset 252, to match calibrated offset 254 before projecting the stereo image pair onto display surface 200. Typically, the alignment is adjusted in the horizontal direction.

Figure 3A:
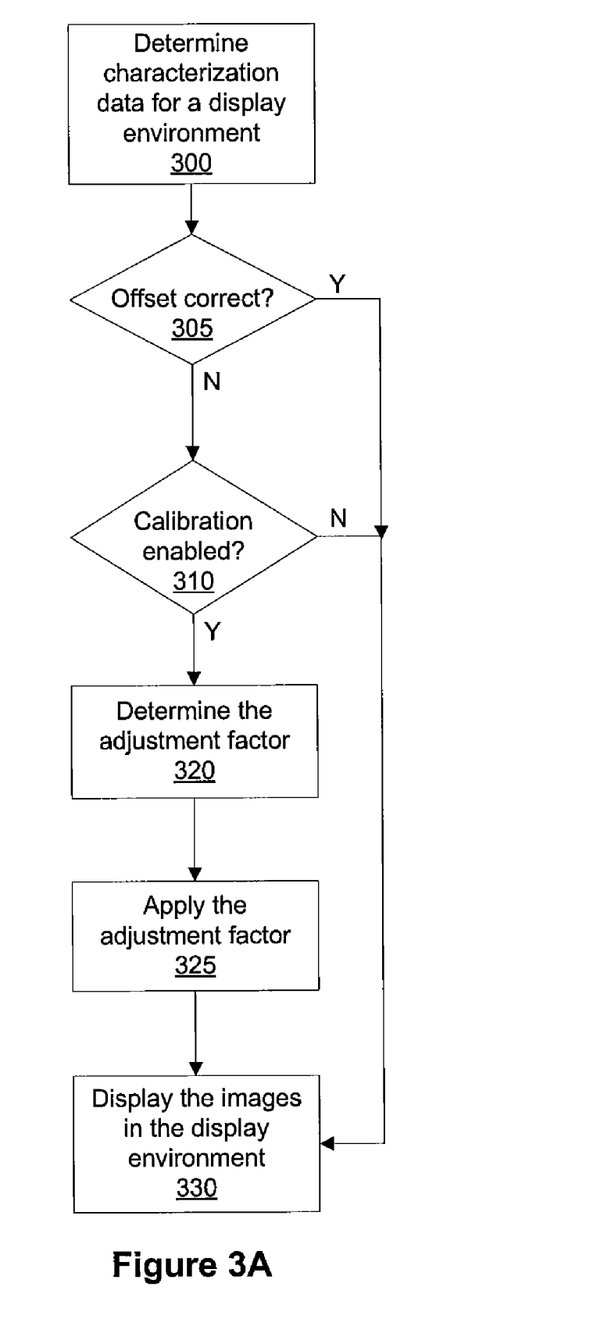
FIG. 3A is a flow diagram of method steps for characterizing and adjusting a convergence point for playback of a stereo content, according to one embodiment of the present invention.

FIG. 3A is a flow diagram of method steps for characterizing and adjusting a convergence point for playback of a stereo content, according to one embodiment of the present invention. Although the method steps are described with respect to FIGS. 2A-2C, persons skilled in the art will understand that any system configured to perform the method steps, in any order, falls within the scope of the present invention.

The method begins in step 300, where characterization data for a display environment is determined. Several techniques may be used to determine the characterization data. For example, the stereo image offset between a left and a right eye image of a stereo pair, such as characterized offset 252, may be measured to produce the characterization data. The characterization data may be determined by projecting a stereoscopic test pattern onto display surface 200 and physically measuring a characteristic of the displayed stereoscopic text pattern to determine characterized offset 252. The measured characteristic can be a distance between elements of the stereoscopic test pattern, such as crosshairs, circles or other shapes, a diameter or radius of a shape, and the like. Alternatively, characterized offset 252 is encoded as part of the stereoscopic test pattern, such that the displayed stereoscopic test pattern visually indicates the value of characterized offset 252. Various different values of characterized offset 252 are encoded in the stereoscopic test pattern, and the value that corresponds to the particular display environment is visible in the displayed stereoscopic test pattern.

Alternatively, in step 300, the characterization data may be computed based on the screen size, the predetermined offset used to create the stereoscopic image content, and the size of display surface 200. The predetermined offset may be a standard human interoccular distance, such as interoccular distance 205. In other embodiments of the present invention, the characterization data may be determined using a physical device to calibrate display system 250. The physical device may indicate the length of calibrated offset 254 and the offset between the left and right eye images may be dynamically adjusted by display system 250 while a stereoscopic test pattern is displayed. When the offset matches calibrated offset 254, the characterization data can be determined by display system 250 based on the adjustment that was applied.

If, in step 305, a determination is made that the characterized offset 252 matches the calibrated offset 254, i.e., that the actual offset is correct, then no adjustment of the alignment between the left and right eye images is needed to produce the convergence point intended by the content author. The method then proceeds directly to step 330, where the stereoscopic images are displayed using characterized offset 252. Otherwise, if characterized offset 252 is determined to not match calibrated offset 254, then in step 310, display system 250 determines if calibration is enabled for displaying the stereoscopic content. If calibration is not enabled, then the method proceeds directly to step 330, where the stereoscopic images are displayed using characterized offset 252. In some use scenarios, displaying the stereoscopic content without adjusting the offset between stereo pairs may be desirable. For example, characterized offset 252 may be considered to be correct when it is within a threshold of calibrated offset 254. The threshold may be a percentage of calibrated offset 254 or a value that is fixed or specified by a viewer, content author, or display system 254.

If, in step 310, display system 250 determines that calibration is enabled, then in step 320, an adjustment factor is determined. The adjustment factor may be computed using the characterization data. For example, the adjustment factor may be a ratio of the size of display surface 200 to the screen size assumed by the content author when creating the image content or a ratio of characterized offset 252 to calibrated offset 254. The adjustment factor may also be determined when the physical device is used to calibrate display system 250.

In step 325, the adjustment factor is applied by display system 250 to produce an adjusted offset between the left and right eye images of each stereo pair in the stereoscopic content. Specifically, using the adjustment factor, display system 250 adjusts the offset, as needed, to equal calibrated offset 254. In step 330, the images are output by display system 250 for display on display surface 200 using calibrated offset 254. Just as a threshold may be used to determine whether or not the offset is correct, a threshold may be used to adjust the offset to be within a certain range of calibrated offset 254. In other words, the offset may be adjusted to equal calibrated offset 254 plus or minus the threshold. The threshold may be a percentage of calibrated offset 254 or a value that is fixed or specified by a viewer, content author, or display system 250.

In some cases, all of the stereo image pairs of the stereo content may be displayed using a single adjustment factor. In other cases, it may be desirable to dynamically change the adjustment factor. For such a purpose, additional characterization data may be encoded within the stereo content. For example, an author of the stereo content may want to change a viewer's focus from an actor's face, having an associated convergence point on display surface 200, to distant vista, having no convergence point, with separation equal to the interoccular separation. The author may change the convergence point for each frame (i.e., each stereo image pair), each shot, or at any other desired frequency. The additional characterization data that is encoded within the stereo content represents changes in the convergence point, i.e., animates the convergence point.

Figure 3B:
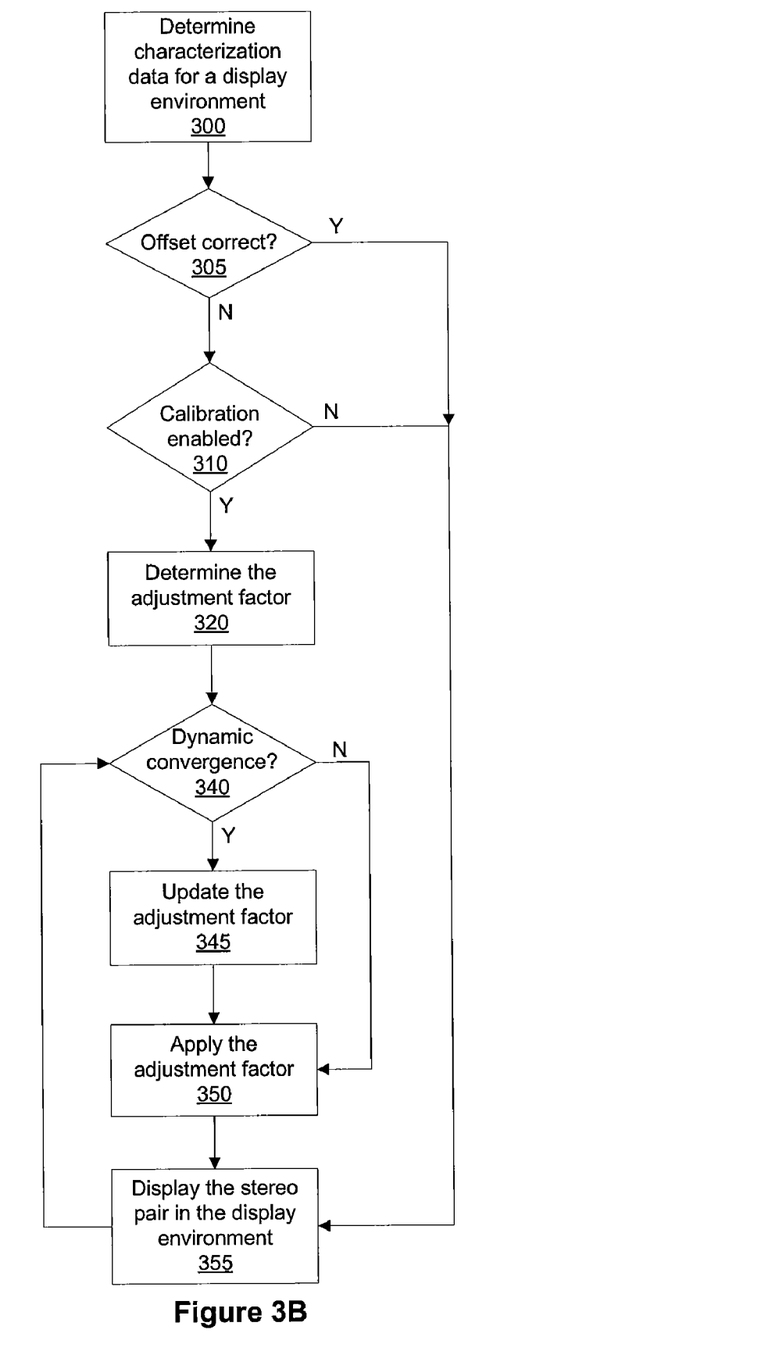
FIG. 3B is a flow diagram of method steps for characterizing and adjusting a convergence point for playback of a stereo content using a dynamic adjustment factor, according to another embodiment of the present invention.

FIG. 3B is a flow diagram of method steps for characterizing and adjusting a convergence point for playback of a stereo content using a dynamic adjustment factor, according to another embodiment of the present invention. Although the method steps are described in reference to FIGS. 2A-2C, persons skilled in the art will understand that any system configured to perform the method steps, in any order, falls within the scope of the present invention.

In one embodiment, steps 300, 305, 310, and 320 are first performed as described above in FIG. 3A. Therefore, no additional description is provided herein. The method then process to step 340, where display system 250 determines if the stereo content includes additional characterization data indicating that the adjustment factor used to control the convergence point should be determined dynamically. If not, the method proceeds directly to step 350. Otherwise, in step 345, the adjustment factor is updated to reflect the convergence point specified by the additional characterization data. In step 350, the adjustment factor is applied by display system 250 to produce calibrated offset 254 between the left and right eye images of each stereo pair in the stereo content. When the adjustment factor is dynamic, reflecting updates from step 345, calibrated offset 254 varies as the adjustment factor varies, thereby producing a dynamic convergence point. In step 355, the stereo image pair is output by display system 250 for display on display surface 200 using calibrated offset 254. Steps 340, 345, 350, and 355 are repeated for each stereo pair in the stereo content.

Adjusting the offset between the stereo images enables display system 250 to replicate the viewer experience that was intended by the author of the stereo content. Additionally, viewer discomfort due to eye strain or eye fatigue may be reduced or avoided when the stereo content is scaled up or down from the intended display size. Finally, performing the offset adjustment in display system 250 allows for stereo content to be retargeted to different display sizes without regenerating the stereo content.

Figure 4:
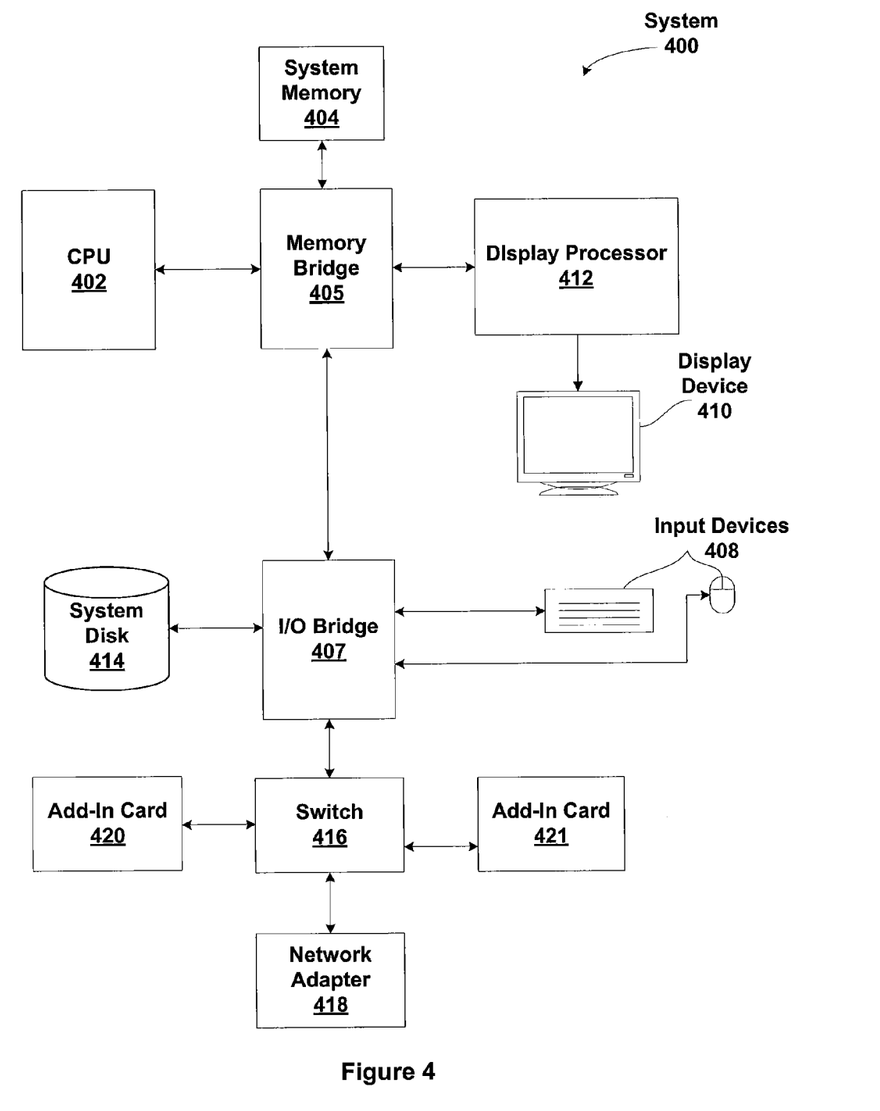
FIG. 4 is a block diagram of a system configured to implement one or more aspects of the present invention.

FIG. 4 is a block diagram of a system 400 configured to implement one or more aspects of the present invention. System 400 may be a personal computer, video game console, personal digital assistant, or any other device suitable for practicing one or more embodiments of the present invention. Any number of the elements shown in system 400 may be included in display system 250.

As shown, system 400 includes a central processing unit (CPU) 402 and a system memory 404 communicating via a bus path that may include a memory bridge 405. CPU 402 includes one or more processing cores, and, in operation, CPU 402 is the master processor of system 400, controlling and coordinating operations of other system components. System memory 404 stores software applications and data for use by CPU 402. CPU 402 runs software applications and optionally an operating system. Memory bridge 405, which may be, e.g., a Northbridge chip, is connected via a bus or other communication path (e.g., a HyperTransport link) to an I/O (input/output) bridge 407. I/O bridge 407, which may be, e.g., a Southbridge chip, receives user input from one or more user input devices 408 (e.g., keyboard, mouse, joystick, digitizer tablets, touch pads, touch screens, still or video cameras, motion sensors, and/or microphones) and forwards the input to CPU 402 via memory bridge 405.

A display processor 412 is coupled to memory bridge 405 via a bus or other communication path (e.g., a PCI Express, Accelerated Graphics Port, or HyperTransport link); in one embodiment display processor 412 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 404.

Display processor 412 periodically delivers pixels to a display device 410 (e.g., a screen or conventional CRT, plasma, OLED, SED or LCD based monitor). Additionally, display processor 412 may output pixels to film recorders adapted to reproduce computer generated images on photographic film. Display processor 412 can provide display device 410 with an analog or digital signal.

A system disk 414 is also connected to I/O bridge 407 and may be configured to store stereo content and applications and data for use by CPU 402 and display processor 412. System disk 414 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 416 provides connections between I/O bridge 407 and other components such as a network adapter 418 and various add-in cards 420 and 421. Network adapter 418 allows system 400 to communicate with other systems via an electronic communications network, and may include wired or wireless communication over local area networks and wide area networks such as the Internet.

Other components (not explicitly shown), including USB or other port connections, film recording devices, and the like, may also be connected to I/O bridge 407. For example, an audio processor may be used to generate analog or digital audio output from instructions and/or data provided by CPU 402, system memory 404, or system disk 414. Communication paths interconnecting the various components in FIG. 4 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, display processor 412 incorporates circuitry optimized for graphics and video processing, including, for example, video output circuitry, and constitutes a graphics processing unit (GPU). In another embodiment, display processor 412 incorporates circuitry optimized for general purpose processing. In yet another embodiment, display processor 412 may be integrated with one or more other system elements, such as the memory bridge 405, CPU 402, and I/O bridge 407 to form a system on chip (SoC). In still further embodiments, display processor 412 is omitted and software executed by CPU 402 performs the functions of display processor 412.

Pixel data can be provided to display processor 412 directly from CPU 402. In some embodiments of the present invention, instructions and/or data representing a scene are provided to a renderfarm or a set of server computers, each similar to system 400, via network adapter 418 or system disk 414. The renderfarm generates one or more rendered images of the scene using the provided instructions and/or data. These rendered images may be stored on computer-readable media in a digital format and optionally returned to system 400 for display. Similarly, stereo image pairs processed by display processor 412 may be output to other systems for display, stored in system disk 414, or stored on computer-readable media in a digital format.

Alternatively, CPU 402 provides display processor 412 with data and/or instructions defining the desired output images, from which display processor 412 generates the pixel data of one or more output images, including characterizing and/or adjusting the offset between stereo image pairs. The data and/or instructions defining the desired output images can be stored in system memory 404 or graphics memory within display processor 412. In an embodiment, display processor 412 includes 3D rendering capabilities for generating pixel data for output images from instructions and data defining the geometry, lighting shading, texturing, motion, and/or camera parameters for a scene. Display processor 412 can further include one or more programmable execution units capable of executing shader programs, tone mapping programs, and the like.

CPU 402, renderfarm, and/or display processor 412 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 404 is connected to CPU 402 directly rather than through a bridge, and other devices communicate with system memory 404 via memory bridge 405 and CPU 402. In other alternative topologies display processor 412 is connected to I/O bridge 407 or directly to CPU 402, rather than to memory bridge 405. In still other embodiments, I/O bridge 407 and memory bridge 405 might be integrated into a single chip. The particular components shown herein are optional; for instance, any number of add-in cards or peripheral devices might be supported. In some embodiments, switch 416 is eliminated, and network adapter 418 and add-in cards 420, 421 connect directly to I/O bridge 407.

Various embodiments of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for adjusting a convergence point for a stereoscopic image, the method comprising:
   determining that a characterized offset between a left eye image and a right eye image of a stereo image pair in a display environment does not equal a calibrated predetermined offset value used when the stereo image pair was created; and
   determining an adjustment factor that when applied to the stereo image pair at display time increases or decreases the characterized offset to produce the calibrated predetermined offset between the left eye image and the right eye image of the stereo image pair to adjust the convergence point for the display environment.

2. The method of claim 1, further comprising displaying the left eye image and the right eye image of the stereo image pair in the display environment using the calibrated predetermined offset.

3. The method of claim 1, further comprising the steps of:
   determining that the adjustment factor has changed from a first value to a second value between a first stereo image pair and a second stereo image pair;
   applying the first value to produce a first calibrated predetermined offset between the first stereo image pair; and
   applying the second value to produce a second calibrated predetermined offset between the second stereo image pair.

4. The method of claim 3, further comprising the steps of:
   displaying the first stereo image pair in the display environment using the first calibrated predetermined offset; and
   displaying the second stereo image pair in the display environment using the second calibrated predetermined offset.

5. The method of claim 1, wherein determination of the adjustment factor comprises computing a ratio of a dimension of a display surface corresponding to the calibrated predetermined offset value to the dimension of a display surface in the display environment.

6. The method of claim 5, wherein the dimension is a horizontal width.

7. The method of claim 1, wherein the adjustment factor is encoded with the stereo image pair.

8. The method of claim 1, wherein the calibrated predetermined offset is greater than the characterized offset before the application of the adjustment factor.

9. The method of claim 1, wherein the calibrated offset is less than the characterized offset before the application of the adjustment factor.

10. The method of claim 1, wherein determination of the adjustment factor comprises:
    displaying a stereoscopic test pattern in the display environment;
    measuring the characterized offset in the display environment; and
    computing a ratio of the calibrated predetermined offset value to the characterized offset.

11. The method of claim 1, wherein the characterized offset is determined to not equal the calibrated predetermined offset value when the characterized offset is not within a threshold of the calibrated predetermined offset value.

12. A non-transitory computer readable medium storing instructions for causing a processor to adjust a convergence point for a stereoscopic image by performing the steps of:
determining that a characterized offset between a left eye image and a right eye image of a stereo image pair in a display environment does not equal a calibrated predetermined offset value used when the stereo image pair was created; and
determining an adjustment factor that when applied to the stereo image pair at display time increases or decreases the characterized offset to produce the calibrated predetermined offset between the left eye image and the right eye image of the stereo image pair to adjust the convergence point for the display environment.

13. A stereoscopic image calibration system, comprising:
a display processor configured to:
receive stereo image pair characterization data indicating that a characterized offset between a left eye image and a right eye image of a stereo image pair in a display environment does not equal a calibrated predetermined offset value used when the stereo image pair was created;
determine an adjustment factor using the characterization data that when applied to the stereo image pair at display time increases or decreases the characterized offset to produce the calibrated predetermined offset between the left eye image and the right eye image of the stereo image pair to adjust a convergence point for the display environment.

14. The system of claim 13, wherein the system further comprises a projector that is coupled to the display processor and configured to project the left eye image and the right eye image of the stereo image pair that are aligned according to the calibrated predetermined offset onto a display surface within the display environment.

15. The system of claim 13, wherein the display processor is further configured to:
determine that the adjustment factor has changed from a first value to a second value between a first stereo image pair and a second stereo image pair;
apply the first value to produce a first calibrated predetermined offset between a left eye image and a right eye image of the first stereo image pair; and
apply the second value to produce a second calibrated predetermined offset between a left eye image and a right eye image of the second stereo image pair.

16. The system of claim 15, wherein the display processor is further configured to:
use the first calibrated predetermined offset to display the first stereo image pair in the display environment; and
use the second calibrated predetermined offset to display the second stereo image pair in the display environment.

17. The system of claim 13, wherein the display processor is further configured to determine the adjustment factor by computing a ratio of a dimension of a display surface corresponding to the calibrated predetermined offset value to the dimension of a display surface in the display environment.

18. The system of claim 13, wherein the adjustment factor is encoded with the stereo image pair.

19. The system of claim 13, wherein the characterized offset is determined to not equal the calibrated predetermined offset value when the characterized offset is not within a threshold of the calibrated predetermined offset value.

20. A method for aligning a left eye image and the right eye image of a stereoscopic image pair in a display environment having a target screen size, the method comprising:
receiving characterization information specific to the display environment having the target screen size;
receiving the left eye image of the stereoscopic image pair, wherein the left eye image was created for a screen size that is different than the target screen size;
receiving the right eye image of the stereoscopic image pair, wherein the right eye image was created for the screen size that is different than the target screen size; and
adjusting, at display time, a characterized offset between the left eye image and the right eye image using the characterization information to change a perceived depth of an object in a scene represented by the stereoscopic image pair.

21. The method of claim 20, wherein the characterization information is encoded in a stereoscopic test pattern that is displayed in the display environment.

22. The method of claim 20, wherein the characterized offset for the stereoscopic image pair is different than a characterized offset for a second stereoscopic image pair.

23. The method of claim 20, wherein adjusting the characterized offset comprises determining that the characterized offset is not within a threshold of a calibrated predetermined offset value.

24. A non-transitory computer readable medium storing instructions for causing a processor to align a left eye image and the right eye image of a stereoscopic image pair in a display environment by performing the steps of:
receiving characterization information specific to the display environment;
receiving the left eye image of the stereoscopic image pair;
receiving the right eye image of the stereoscopic image pair; and
adjusting a characterized offset between the left eye image and the right eye image using the characterization information to change a perceived depth of an object in a scene represented by the stereoscopic image pair.

25. A stereoscopic image display system, the system comprising:
a display processor configured to:
receive characterization information specific to a display environment;
receive a left eye image of a stereoscopic image pair;
receive a right eye image of the stereoscopic image pair; and
adjust a characterized offset between the left eye image and the right eye image using the characterization information to change a perceived depth of an object in a scene represented by the stereoscopic image pair.

26. The system of claim 25, wherein the display processor is further configured to display a stereoscopic test pattern that indicates the characterization information in the display environment.

27. The system of claim 25, wherein the characterized offset for the stereoscopic image pair is different than a characterized offset for a second stereoscopic image pair.

28. The system of claim 25, wherein the display processor is further configured to adjust the characterized offset after determining that the characterized offset is not within a threshold of a calibrated predetermined offset value.

29. The method of claim 1, further comprising displaying the left eye image and the right eye image of the stereo image pair in the display environment using a single lens stereo projection system.

30. The non-transitory computer readable medium of claim 12, further comprising displaying the left eye image and the right eye image of the stereo image pair in the display environment using a single lens stereo projection system.

31. The system of claim 13, wherein the system further comprises a single lens stereo projection system that is coupled to the display processor and configured to project the left eye image and the right eye image of the stereo image pair.

* * * * *